Sept. 11, 1962 W. S. KING 3,053,469
FISHING REEL MOUNTING
Filed Aug. 29, 1960 3 Sheets-Sheet 1
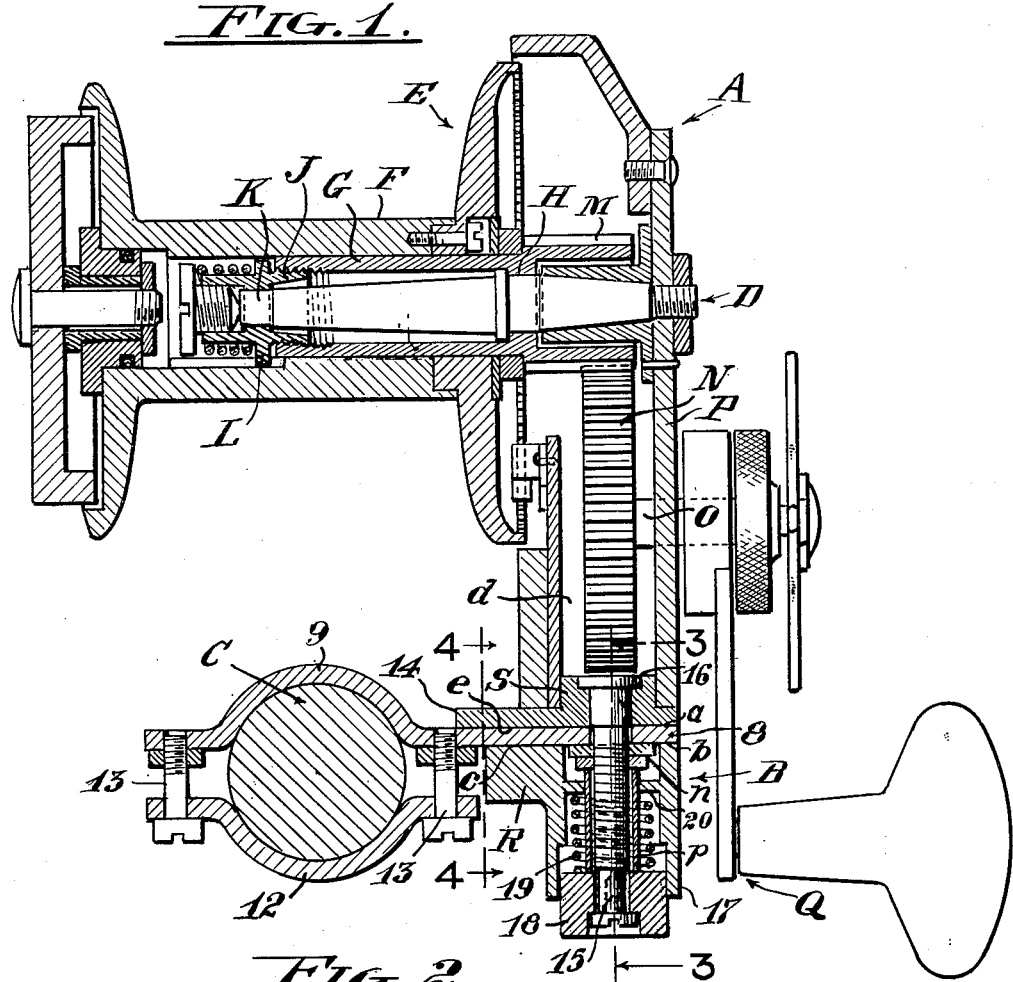
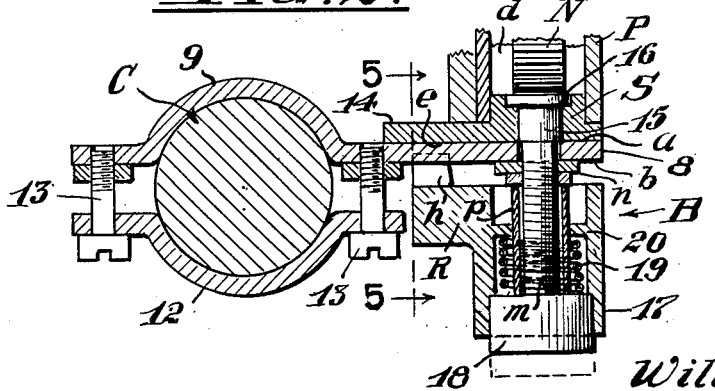
INVENTOR.
William S. King
BY R. S. Berry
Att'y.

Sept. 11, 1962        W. S. KING        3,053,469
FISHING REEL MOUNTING
Filed Aug. 29, 1960        3 Sheets-Sheet 2
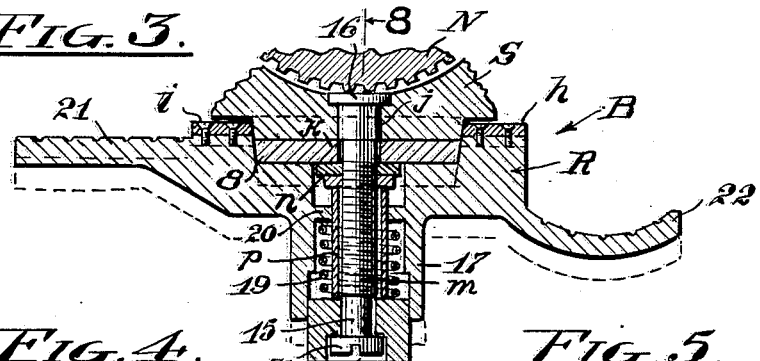
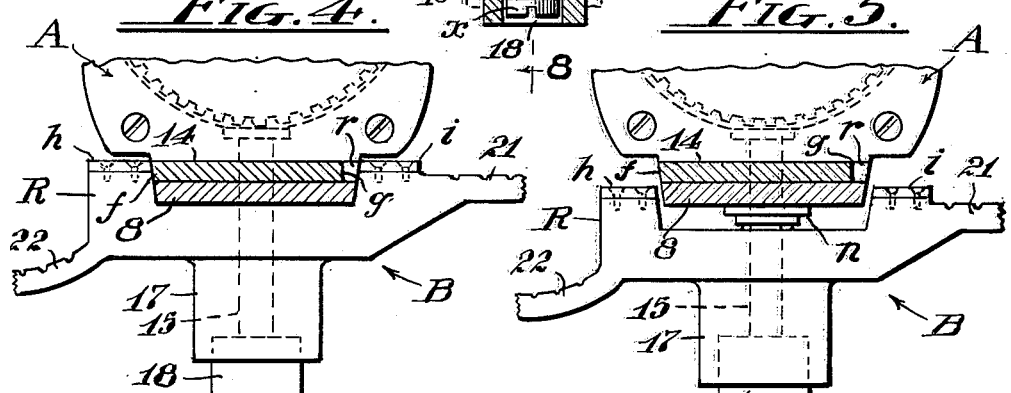
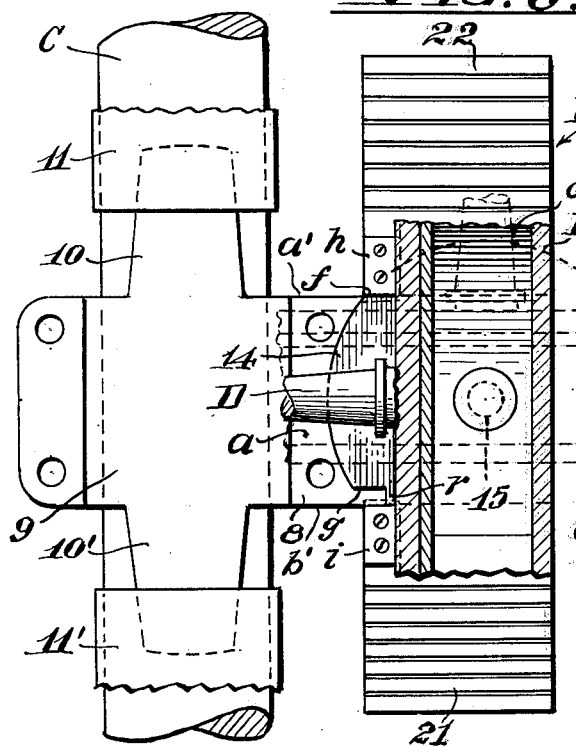
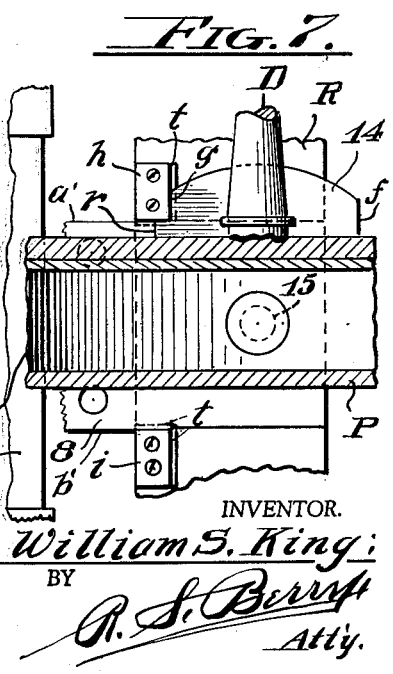
INVENTOR.
William S. King
BY R. S. Berry
Atty.

Sept. 11, 1962 W. S. KING 3,053,469
FISHING REEL MOUNTING
Filed Aug. 29, 1960 3 Sheets-Sheet 3
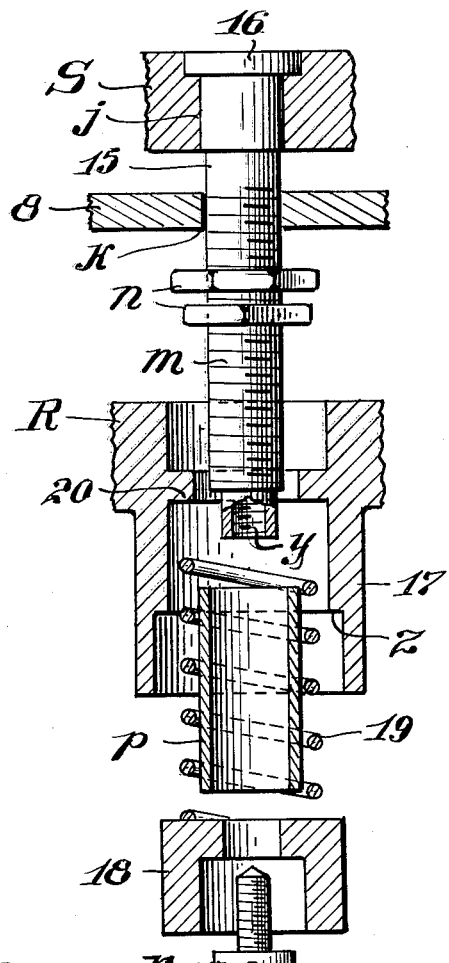
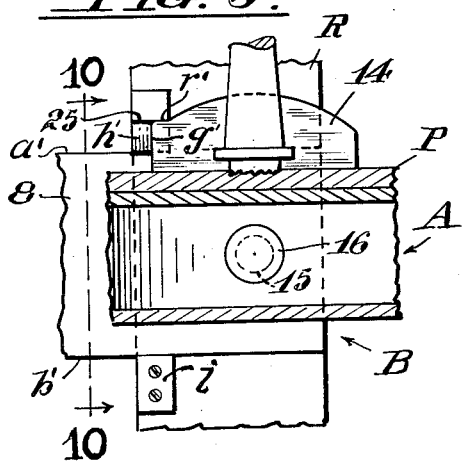
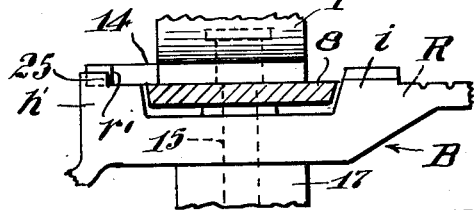
INVENTOR
William S. King
BY
ATTORNEY

United States Patent Office 3,053,469
Patented Sept. 11, 1962

3,053,469
FISHING REEL MOUNTING
William S. King, 6532 Day St., Tujunga, Calif.
Filed Aug. 29, 1960, Ser. No. 52,658
11 Claims. (Cl. 242—84.2)

This invention relates to a fishing reel and particularly pertains to a mounting therefor.

The primary object of the invention is to provide a mounting for a fishing line reel whereby the reel may be employed in a casting operation wherein the line passes off the forward end of the line spool without rotating the latter and whereby the reel may also be utilized as a conventional spool type reel wherein the line is directly rewound on the spool by rotating the latter.

A particular object is to provide a construction in the reel mounting whereby the reel may be readily disposed with the axis of the line spool extending in either transverse or longitudinal relation to the pole on which the reel is mounted.

Another object is to provide an effective means for rigidly locking the reel against free movement on its mounting in either its rewinding position or its line casting position and whereby the reel may be readily manually disengaged from its locking means and swung from either one of its positions to the other when desired.

Another object is to provide a reel mounting of the above character which is especially applicable to fishing reels of the type used in deep sea fishing operations wherein larger spools and greater lengths of line are employed than are ordinarily used in lake and stream fishing operations.

With the foregoing objects in view together with such other objects and advantages as may subsequently appear, the invention resides in the construction and arrangement of parts hereinafter described and claimed, and illustrated by way of example in the accompanying drawings, in which:

FIG. 1 is a view in cross section partly in elevation of a fishing reel and its mounting, with portions of the reel removed, showing the reel disposed in its locked line rewinding position;

FIG. 2 is a similar view of the reel mounting showing parts in their unlocked position preliminary to turning the reel to swing the spool laterally from the position shown in FIG. 1 to the line casting position;

FIG. 3 is a view in section partly in elevation taken on the line 3—3 of FIG. 1;

FIG. 4 is a view in section and elevation as seen on the line 4—4 of FIG. 1 in the direction indicated by the arrows showing the reel as locked in its rewinding position;

FIG. 5 is a view similar to FIG. 4 showing the reel in its unlocked position in readiness for movement to the line casting position;

FIG. 6 is a plan view of the reel mounting with portions of the reel shown in horizontal section and plan with portions removed, indicating the reel with the spool thereof in its rewinding position;

FIG. 7 is a view similar to FIG. 6 with the reel indicated as locked against pivotal movement in either direction with the spool thereof in its line casting position;

FIG. 8 is an exploded view in section and elevation of the parts seen on the line 8—8 of FIG. 3;

FIG. 9 is a detail in plan similar to FIG. 7 showing a modification of the reel locking mechanism wherein the reel is held against movement in one direction only and free to be retracted from its line casting position; and FIG. 10 is a view in section and elevation as seen on the line 10—10 of FIG. 9 in the direction indicated by the arrows.

Referring to the drawings more specifically A indicates generally the housing of a fishing reel, B designates a mounting on which the housing A is supported, and C denotes a pole to which the mounting B is attached.

The housing A carries a fixed spindle D which projects laterally therefrom and has mounted thereon a revoluble spool E on which is wound a fishing line (not shown) in a usual manner. The spool E is here shown as embodying a hub F carried on a sleeve G having its inner end portion revolubly bearing on the spindle D, as indicated at H, and having its outer end fixed on a supplemented sleeve J journalled on the outer end of the spindle D as indicated at K. The sleeve J is connected to the hub F of the reel E by a spline L whereby rotary movement of the sleeves G—J will be transmitted to the spool E.

The inner end portion of the sleeve G has integral spur-gear teeth M on its periphery which mesh with a driving spur-gear N within the housing A. The spur-gear N is fixed on a drive shaft O extending through a side wall P of the housing and has its outer portion fitted with a hand-crank Q whereby the shaft O and gear N may be rotated to drive the spol E through the interengaged sleeves G—J to rewinding line on the spool.

The above recited structure of the fishing reel constitutes no part of the present invention other than in association therewith, the essence of the invention residing in the mounting B on which the fishing reel is pivotally carried and whereby the reel may be swung to and from either an end casting position or a rewinding position.

As here shown the mounting B embodies an elongated reel supporting plate 8 having flat upper and lower faces $a$—$b$ and parallel side margins $a'$—$b'$ with a saddle 9 on one end portion thereof from the opposite side margins of which project ears 10—10'. The saddle 9 and ears 10—10' are adapted to seat on and conform to the upper surface of the pole C with the ears affixed to the pole by slip-rings 11—11' in the usual manner. As a further means of fastening the saddle 9 on the pole a clamping strap 12 is seated on the lower face of the pole C with its opposite ends projecting laterally from the pole; the strap 12 being connected to the end portions of the saddle 9 by bolts 13 which pass through the strap and are screwed into engagement with the saddle 9 so as to tightly clamp the pole between the saddle and strap. The plate 8 is thus mounted on the pole to project laterally from a side thereof.

The mounting B also embodies an elongated manually controlled locking bar R which underlies the plate 8 and has a flat face $c$ on its upper side which normally abuts the lower face $b$ of the plate 8. The bar R is connected for relative movement to a base member S of the reel housing A which base member is here shown as being integral with the upstanding marginal wall $d$ of the housing. The bar R is adapted to be depressed relative to the plate 8 as will presently be described.

The reel base S has a flat underside $e$ which seats on the flat upper face $a$ of the plate 8 substantially co-extensive with the latter, and projecting from the rear portion of the base S in continuation thereof is a flange 14 the underside of which extends in continuation of the underside $e$ of the base S and abuts the plate 8. The flange 14 has end margins $f$—$g$ adapted to be disposed in and out of locking engagement with spaced abutments $h$—$i$ on the locking bar R to hold the reel against pivotal movement in its rewinding position as shown in FIG. 6 and to hold the reel against retrograde pivotal movement in the line casting position, as shown in FIG. 7.

The abutments $h$—$i$ project upward from the locking bar adjacent opposite edges of the plate 8 and normally extend on a plane slightly above the plane of the upper surface of the plate as shown in FIGS. 3-4. The abutments *h—i* also serve as stops to hold the locking bar R against both lateral and pivotal movements relative to the plate 8, and normally abut the opposed edges of the plate 8 to thereby hold the locking bar against longitudinal rocking movement relative to the plate.

The connection between the reel base S plate 8, and locking bar R, particularly shown in FIG. 8, embodies an upright stem 15 the upper end portion of which projects through aligned apertures *j—k* in the base S and plate 8 respectively with a flange 16 on the upper end of the stem seated in a recess in the upper face of the base S and with the lower portion of the stem projecting downward through an open ended sleeve 17 on the underside of the locking bar R. The upper end portion of the stem 15 has a right fit in the aperture *j* and is thereby fixed relative to the reel base S, and has sliding pivotal contact with the margin of the aperture *k*. The stem 15 has threads *m* extending along a portion of the length thereof and screwed on such threads are nuts *n* which slidably abut against the underside of the plate 8 so as to turnably hold the stem 15 in place relative to the plate 8 and which nuts co-operate with the flange 16 to retain the base S in slidable contact with the plate 8. The upper end portion of the stem 15 thus forms a pivotal connection between the reel base S and plate 8 on which the reel may be turned laterally relative to its mounting.

The lower end of the stem 15 is fitted with a pivotally mounted thumb rest button 18 which projects from the open lower end of the sleeve 17 between the inner end of which button and the nuts *n* extends a spacing tube *p*. The button 18 is held in place on the stem by a headed screw *x* the head of which is recessed in the button and the threaded shank of which is engaged in an internally threaded recess *y* in the lower end of the stem 15.

A coil spring 19 bears between the inner end of the button 18 and a shoulder 20 on the interior of the sleeve 17 which spring acts to normally yieldably support the locking bar R in abutting relation to the underside of the plate 8 as shown in FIG. 1. The sleeve 17 is designed to be advanced downwardly relative to the button 18 as will presently be described, and as a means for limiting such relative movement the interior of the sleeve 17 has a shoulder *z* spaced inwardly from its outer end and normally from the inner end of the button 18, which shoulder serves as an abutment for the button 18.

The locking bar R extends parallel to the pole C in spaced but contiguous relation thereto, and has end portions 21—22 which constitute fingerholds whereby the bar R may be manually pulled downward relative to the plate 8 as shown in full lines in FIGS. 2 and 5, and indicated in dotted lines in FIG. 3, the end portion 21 being adapted to be engaged by the thumb of the left hand while the rod C is being held between the fingers and palm of the left hand and the end portion 22 being adapted to be engaged by a finger or fingers of the right hand while the thumb of the right hand is seated against the lower end of the button 18. The end portions 21—22 of the locking bar project in the directions of the butt and tip ends respectively of the pole C and thus project laterally from opposite marginal portions of the plate 8 extending on opposite sides of the stem 15 whereby in pulling the locking bar downward by the application of forces to the opposite end portions thereof such forces will be at least substantially uniformly distributed on the bar on opposite sides of the stem 15 so as to insure downward movement of the locking bar in parallel relation to the stem 15 thereby eliminating all possibility of the locking bar binding on the stem. The flange 20 then sliding on sleeve *p* serves as a guide aiding in attaining such parallel movement.

When the locking bar R is in its normal uppermost position while the reel is disposed within the spool E overlying the pole C in its rewinding position, shown in FIGS. 1, 4 and 6, the abutments *h—i* extend alongside the end margins *f—r* of the flange 14 on the reel base S in abutting relation thereto, thereby locking the reel housing A against turing movement. Manifestly a cast may be made with the reel in this rewinding position in the usual manner on release of drag mechanism with which the reel is ordinarily equipped and not necessary to be here shown.

In the operation of the invention when it is desired to move the spool E from the rewinding position shown in FIGS. 1 and 6, to its end casting position shown in FIG. 7, the fisherman while grasping the pole C in the left hand, places the thumb of such hand over the extended end portion 21 of the locking bar R and simultaneously places the forefingers of the right hand over the other end portion 22 of the locking bar and at the same time sets the thumb of the right hand on the outer end of the button 18. A downward pull is then exerted on the ends 21—22 of the locking bar while pressing the thumb against the button 18, thereby effecting downward movement of the locking bar R relative to the reel supporting plate 8 in opposition to the spring 19 so as to space the top face *c* of the locking bar from the lower face *b* of the plate 8 as shown in FIGS. 2 and 5 and at the same time lowering the abutments *h* and *i* on the bar R to a position where the upper ends of the abutments will lie on a plane spaced beneath the underside *e* of the base S. The reel housing A will then be free of engagement with the locking bar R as shown in FIGS. 2 and 5 so that it may be manually turned on the stem 15 from the position shown in FIG. 6 to dispose the spool E in its line casting position shown in FIG. 7 in which the outer end of the spool is presented toward the outer end of the pole C. In effecting this turning movement of the reel housing A, the locking bar R is held in its lowered position by the thumb of the left hand thus freeing the right hand which is then utilized in turning the reel to its line casting position.

When the reel housing is released from the locking bar R and slightly turned from the position shown in FIG. 5 to dispose the flange 14 in overlying relation to the abutment *h*, the flange 14 advancing relative to the plate 8, the operator may then lift his thumb from the end portion 21 of the locking bar R thus releasing the locking bar so that the spring 19 which is then compressed as shown in FIG. 2, will exert a thrust between the button 18 and the flange 20 so as to seat the underside of the flange 14 on the upper end of the abutment *h*. The reel housing may then be advanced on the pivot pin 15 with the flange 14 bearing on the abutment *h* under the urge of the spring 19 whereby sufficient frictional engagement between the flange 14 and the abutment will be developed as to restrain the reel housing against free swinging movement in either direction from any position thereof intermediate its rewinding or line casting positions as long as the flange 14 rides on the abutment. However, continued advance turning movement of the reel housing on the pivot pin 15 will move the end *g* of the flange 14 off the abutment *h* whereupon the spring 19 will act to thrust the locking-bar to its seated position against the underside of the plate 8 to thereby dispose the inner side of the abutments *h* alongside the end margin *g* of the flange 14 as shown in FIG. 7 thus automatically lock the reel base S against retrograde turning movement. As a means for limiting the outward swinging movement of the reel as above described, the end margin *g* of the flange 14 is provided with a shoulder *r* arranged to abut against the inner end of the abutment *h* as shown in FIG. 7 when the reel housing is disposed in its fully advanced line casting position, the shoulder *r* co-operating with the adjacent end margin *g* of the flange 14 when the shoulder *r* and margin *g* are both engaged with the abutment *h* to rigidly lock the reel housing against turning in either direction from the line casting position.

When the spool is thus disposed, it will occupy a position spaced laterally from the pole C by reason of its pivotal mounting on the stem 15 being offset in horizontal spaced relation to the pole, whereby in making a cast, the line which passes through a guide ring on the outer end of the pole when unwinding from the end of the spool, will lead diagonally from the spool to the end of the pole in such spaced relation to the latter as not to be apt to lash the pole with possible damage to the line.

To restore the reel to the winding position the locking bar is depressed relative to the plate 8 and flange 14 as above described to dispose abutment $h$ clear of the end margin $g$ and shoulder $r$ of the flange 14, whereupon the reel may be swung back to its rewinding position, then on release of the locking bar the latter will advance against the underside of the plate 8 under the urge of the spring 19 thereby positioning the abutments $i$—$h$ astride the flange 14 in abutting relation to the end margins thereof as shown in FIGS. 3, 4 and 6. However the locking bar may be released by the operator on retrograde turning of the reel housing slightly from the line casting position so that the flange 14 may ride against the upper end of the abutment $h$ as before described relative to advance turning movement of the reel housing. In this event, on continued retrograde turning of the reel housing until the end $f$ of the flange 14 rides off the inner end of the abutment $h$, the spring 19 will then automatically thrust the locking bar into the above recited locking position.

As a means for facilitating retraction and advance of the abutments $i$—$h$ in and out of close locking engagement with the margins $a'$—$b'$ of the plate 8, and the overlying ends of the flange 14 the faces $t$ of the abutment $i$—$h$ presented to and contacting the margins of the plate 8 and the ends of the flange 14 are slightly inclined outwardly from their lower to the upper margins. The portions of the margins of the plate 8 and the ends of the flange 14 opposite the inclined faces $t$ of the abutments may be inclined to conform to the faces $t$ provision of the inclined faces as above described affords a tight seating contact between the parts when in their interlocked position yet permits of their ready separation on depressing the locking bar and also allows ready movement of the parts to their relative seated position when the reel is disposed in either its casting or rewinding position.

An important feature of the invention resides in the fact that the locking bar may be released by the operator immediately on swinging the reel housing to dispose the flange 14 in overlying relation to the upper ends of the abutments $h$ as above described since the underside of the flange 14 will then ride on the upper end of the abutment as the reel is turned in either direction with the spring 19 acting to thrust the end of the abutment against the underside of the flange 14 so as to effect a braking action such as to prevent free swinging movement of the reel on its mounting until the flange 14 moves off the upper end of the abutment since there are occasions when it is necessary for the fisherman to release the locking bar while the reel housing is in an intermediate position as where the use of the right hand is required to effect turning of the reel housing on its pivot or to operate the crank or drag mechanism of the reel.

While in the above described structure the reel housing A is adapted to be locked against pivotal movement in either directions when disposed in the line casting position, there are occasions when it is desirable that such locking be dispensed with and the reel housing adapted to be swung out of its advanced line casting position without the necessity of operating the locking bar and with its retrograde pivotal movement effected solely against the resistance offered by the braking action of the spring 19. To accomplish this, the construction shown in FIGS. 9 and 10 is employed wherein the flange 14 is supported on the upper face of the abutment $h'$ when the reel housing is in its advanced line casting position, the end $g'$ of the flange 14 overlying the upper face of the abutment $h'$ instead of being engaged by the inner side of the latter. In this instance advance pivotal movement of the reel housing is limited and arrested by a shoulder $r'$ on the outer margin of the flange 14 where it intersects the end $g'$ thereof abutting an upstanding shoulder 25 on the top of the abutment $h'$ in rearwardly spaced relation to the inner end of the abutment $h'$ when the reel housing is in its advanced position. In this arrangement the locking bar R is manipulated only to effect release of the flange 14 when the reel housing is in the line winding position, on which being done the reel housing being swung to and from its line casting position with the flange 14 riding on the upper face of the abutment $h'$ at all times under the thrust of the spring 19.

While a specific embodiment of the invention has been shown and described, the invention is not limited to the exact details of construction set forth, and the invention embraces such changes, modifications and equivalents of the parts and their formation and arrangement as come within the purview of the appended claims.

I claim:

1. In a fishing reel, a housing having a base, a support on which said base is seated, an upright stem fixed on said base pivotally connecting said base and support whereby said base is turnable back and forth between two positions, said stem having a lower end portion extending downwardly from said support, an elongated locking bar spring supported intermediate its ends on the lower end portion of said stem for bodily movement longitudinally of the latter and normally disposed in an uppermost position abutting said support with the lower end portion of said stem projecting below said bar, a pair of abutments fixed on said locking bar extending upwardly therefrom adjacent opposite margins of said support and projecting thereabove, a flange on said base overlying said support having ends adapted to be engaged between said abutments when said base is in one of its positions and to have one of its ends engaged by one of said abutments when said base is in the other of its positions, said locking bar being manually moveable downward on said stem to dispose the upper ends of said abutments below the underside of said flange to permit turning of said housing on said stem, and fingerholds on the ends of said locking bar adapted to be engaged and depressed by fingers of the hands of the operator while exerting an upward thrust on the lower end portion of said stem by the thumb of a hand.

2. In a fishing reel mounting the combination with a fishing reel housing provided with a base having a laterally projecting side flange the undersides of which base and flange are flat and coplanar, said flange having opposed ends, a line spool carried by said housing; a reel supporting plate having opposed side margins and having a flat upper face on which the undersides of said base and flange slidably seat, means for attaching said plate to a fishing pole to project laterally therefrom, an elongated locking bar longitudinally extending transversely of the underside of said plate having end portions projecting from the side margins of said plate; an upright stem extending through said reel housing base, reel supporting plate and locking bar, said stem having its upper end fixed on said base, said base and stem being turnable relative to said plate; a thumb-rest button pivoted on the lower end of said stem, a downwardly projecting sleeve on said locking bar encompassing the lower portion of said stem and a portion of said button, an internal shoulder on said sleeve, a spring in said sleeve bearing between said shoulder and said button normally urging said locking bar to an uppermost position against the underside of said plate; upstanding abutments on said locking bar normally engageable with opposed ends of said flange to hold said housing with said spool in a rewinding position, one of said abutments being engageable with one of the ends of said flange to dispose said housing and spool in an end casting position; the end portions of said locking bar being adapted to be engaged by fingers of the hands of an operator whereby said locking bar may be depressed in opposition to said spring to move the upper ends of said abutments clear of the ends of said flange to thereby permit turning of the reel housing.

3. The structure called for in claim 2 together with a shoulder on said one of the ends of said base flange engageable with one of said abutments to limit turning movement of said reel housing in the direction of said casting position.

4. The structure called for in claim 2 together with a shoulder on said one of the ends of said base flange adapted to engage one of said abutments and co-operate therewith to lock said reel housing against turning in either direction from said end casting position.

5. In a mounting for fishing reels embodying a base, a reel supporting plate on which said base is seated having side margins, an upright stem pivotally extending through said plate having an upper end portion to which said base is fixedly connected for turning movement between two positions, a locking bar carried on said stem beneath said plate for movement longitudinally of said stem, spring means normally holding said bar in an uppermost position against said plate, a pair of abutments on said bar projecting upwardly therefrom contiguous the side margins of said plate whereby said bar is held against turning relative to said plate, said abutments having upper ends projecting above said plate, means on said base co-operable with said abutments to lock said base against turning movement relative to said plate when in either of its two positions, and finger holds on said locking bar through which the bar may be manually depressed to lower said abutments to free said base and thereby permit turning of said base between its two positions.

6. The structure called for in claim 5 in which said stem has a thumb-rest button on its lower end projecting from the underside of said locking bar.

7. The structure called for in claim 5 in which said stem has an upper end flange engaging said base, and a nut screwed on said stem to abut said plate co-operating with said flange to retain said base in slidable contact with said plate.

8. In a mounting for fishing reels embodying a base, a reel supporting plate on which said base is seated having side margins, an upright stem pivotally extending through said plate having an upper end portion to which said base is fixedly connected for turning movement between two positions, a locking bar carried on said stem beneath said plate for movement longitudinally of said stem, spring means normally holding said bar in an uppermost position against said plate, a pair of abutments on said bar projecting upwardly therefrom contiguous the side margins of said plate whereby said bar is held against turning relative to said plate, said abutments having upper ends projecting above said plate, means on said base co-operable with said abutments to lock said base against turning movement relative to said plate when in one of its two positions, means on said base co-operable with one of said abutments to limit turning movement of said base in one direction, and finger holds on said locking bar whereby said bar may be depressed relative to said base to permit turning movement thereof.

9. In a fishing reel, a housing having a base, a support on which said base is seated, means for attaching said support to a fishing pole, a spool carried by said housing, a stem connecting said base to said support on which said housing may be turned to dispose said spool in either a winding position or an end line casting position, a locking bar carried on said stem for movement toward and away from the underside of said support, spring means for yieldably holding said locking bar against said support, means for interengaging said locking bar and base to hold the latter against turning from its line winding position while said locking bar is held in its uppermost position against said support and adapted to release said base on depressing said locking bar relative to said support, a thumb-rest button on the lower end of said stem and finger engaging end portions projecting from said support opposite opposed sides of said stem.

10. In a fishing reel, a housing having a base, a support on which said base is seated, means for attaching said support to a fishing pole, a spool carried by said housing, a stem fixed on said base pivotally connecting said base to said support on which said housing may be turned to dispose said spool in either a winding position or an end line casting position, a locking bar carried on said stem for movement longitudinally thereof toward and away from said support, spring means for yieldably holding said locking bar against said support, means for interengaging said locking bar and base to hold the latter against turning from its line winding position while said locking bar is held against said support and adapted to release said base on depressing said locking bar relative to said support, said means embodying a pair of upstanding abutments on said locking bar, and a flange on said base having ends adapted to be engaged by one or more of said abutments when said locking bar is in a position contiguous said support and to be disengaged therefrom when in a position away from said support; said support having side margins adapted to abut said abutments when said locking bar is positioned contiguous said support to then hold said locking bar against longitudinal rocking movement relative to said support.

11. In a fishing reel mounting, a reel supporting plate having side margins, a reel housing having a base seated on said plate, an elongated locking bar extending transversely of the underside of said plate, an upright stem having an upper end portion to which said base is affixed, said stem projecting through said plate and locking bar, said base and stem being turnable relative to said plate, a button on the lower end of said stem; a sleeve on said locking bar encompassing said stem, an internal shoulder on said sleeve, a spring in said sleeve encircling said stem and bearing between said button and shoulder normally urging said locking bar to a position abutting said supporting plate, a pair of abutments on said locking bar normally engaging the side margins of said plate, and means on said base co-operable with said abutments to lock said base against turning movement relative to said plate when in either of two positions.

References Cited in the file of this patent
UNITED STATES PATENTS

| | | |
|---|---|---|
| 2,535,746 | Mitchell | Dec. 26, 1950 |
| 2,613,046 | Redding | Oct. 7, 1952 |
| 2,796,224 | Jefferson | June 18, 1957 |